United States Patent Office 2,916,522
Patented Dec. 8, 1959

2,916,522
METHOD FOR MAKING ALPHA CHLOROALKYL METHYL ETHERS

Wayne A. McRae, Lexington, Mass., assignor to Ionics, Incorporated, Cambridge, Mass., a corporation of Massachusetts No Drawing. Application October 3, 1957
Serial No. 687,865

3 Claims. (Cl. 260—614)

The present invention relates to an improved process for making alpha chloroalkyl methyl ethers and more particularly to a process for making alpha chloroalkyl methyl ethers substantially free from inhibiting impurities, by reaction of an alkyl aldehyde, methyl alcohol and hydrogen chloride.

The invention envisions a carefully controlled reaction of hydrogen chloride, methyl alcohol, and an alkyl aldehyde having not more than five carbon atoms under such conditions and at such a rate that formation of undesirable by-products of reaction is prevented or substantially minimized and a pure alpha chloroalkyl methyl ether is obtained. While the production of chloromethyl methyl ether by the present process will serve as an illustrative example, it is understood that any chloroalkyl methyl ether in which the alkyl group has not more than 5 carbon atoms may be prepared by the same method.

More specifically, the method of this invention is directed to the preparation of alpha chloro alkyl methyl ethers having the structure $RCHClOCH_3$ where R is selected from the group consisting of hydrogen, methyl, ethyl, propyl, isopropyl, butyl, isobutyl, sec-butyl and tertiary butyl; that is from aldehydes having the structure RCHO where R has not more than 4 carbons and belong to the same group as above.

It is known to prepare chloromethyl methyl ether by passing hydrogen chloride into a mixture of methyl alcohol and aqueous formaldehyde until the reaction is complete and then separating the upper layer of chloromethyl methyl ether from the lower aqueous layer of the reaction mixture.

This known method has several inherent disadvantages that are overcome by the present invention. In the process as outlined above, yields of chloromethyl methyl ether are lower than are required in an economical commercial process since the reaction is incomplete and a portion of the chloromethyl methyl ether that is formed remains dissolved in the aqueous layer. Attempts to recover the chloromethyl methyl ether dissolved in the aqueous layer by distillation result in decomposition of the chloromethyl methyl ether in the presence of water into methanol, formaldehyde, and hydrogen chloride. Methods for increasing the yield of chloromethyl methyl ether are well known, for example recycling the distillate of the aqueous layer into the reaction chamber, and adding calcium chloride to the reaction mixture to reduce the solubility of the chloromethyl methyl ether in the aqueous layer. It is desirable, however, to obtain high yield of pure chloromethyl methyl ether product by simpler, more economical means.

By previously known methods, chloromethyl methyl ether product is obtained as the organic layer of the reaction mixture. This product is sufficiently pure for some purposes, but in the chloroalkylation of organic compounds, for example, the presence of contaminants (for example 5%) greatly impedes the reaction.

Substantially pure chloroalkyl methyl ethers suitable for high levels of chloroalkylation, can be prepared by the process of this invention, obviating the necessity of further purification of the chloroalkyl methyl ether product by distillation. In addition, commercially economical yields, for example 85%, of chloroalkyl methyl ethers are obtained without distillation of the aqueous layer of the reaction mixture nor addition of calcium chloride to the reaction mixture.

The object of this invention is to produce high yields of chloroalkyl methyl ethers of high activity by reacting an alkyl aldehyde with not more than 5 carbon atoms, a methyl alcohol and hydrogen chloride under carefully controlled conditions. Another object is to prepare pure chloroalkyl methyl ethers suitable for efficient chloroalkylation of organic compounds by preventing the formation of deleterious by-products. A further object of this invention is to prepare substantially pure chloroalkyl methyl ethers in a more economical manner than is possible by means heretofore known.

In the method of this invention, the production of chloromethyl methyl ether by reaction of hydrogen chloride, paraformaldehyde and methanol will serve as an illustrative example, but it is understood that the invention is not limited thereto and includes chloroalkyl methyl ethers obtained from any alkyl aldehyde with not more than 5 carbon atoms, methanol and hydrogen chloride.

To produce high purity chloromethyl methyl ether by this process, methyl alcohol is cooled in a reaction chamber to about 0° C. Hydrogen chloride gas is bubbled through the chamber, and small quantities of paraformaldehyde are introduced to the reaction chamber in stepwise additions. The reaction chamber is continuously cooled, and the rate of addition of paraformaldehyde and HCl is controlled so that the temperature of the reaction is maintained at 20° C. or below and so that the molar amount of aldehyde added is always at least slightly greater than the amount of HCl added until all the required aldehyde has been added. Under these circumstances, the organic phase of chloromethyl methyl ether will not separate from the reaction mixture until almost stoichiometric amounts of HCl have been added. A 5 to 10% molar excess of paraformaldehyde is added and a 30–40% molar excess HCl is bubbled through the reaction chamber until the acid titer of the non-aqueous layer is at least 12.5 N. That is, HCl is bubbled through the reaction mixture after saturation of the mixture until at least a 30% molar excess has been passed through and the acid titer of the organic layer is 12.5 N or above. In general, we have found that the critical acid titer is 95% of the theoretical. If the titer for any chloroalkyl methyl ether is less than this value, the ether will not be satisfactory in chloroalkylation.

The reaction mixture is allowed to stand for 10 to 16 hours at room temperature until substantially all the dissolved (i.e., not chemically reacted) HCl is evolved from the non-aqueous layer. The clear organic layer of pure chloromethyl methyl ether is drawn off, and the aqueous layer discarded. The chloromethyl methyl ether decanted from the reaction mixture is of extremely high purity. After drying, e.g., over anhydrous calcium chloride, it is suitable for rapid, efficient chloromethylation of organic compounds without further purification.

In the instant process, a pure solid, liquid or gaseous form of aldehyde is preferred rather than an aqueous solution. For example, paraformaldehyde or trioxane would be used to prepare chloromethyl methyl ether. It has been found that higher product yields are obtained when the water content of the reaction mixture is kept to a minimum. The presence of water in the mixture tends to inhibit complete reaction of the methanol, aldehyde, and hydrogen chloride since water is a product of the reaction, that is, to require uneconomic excesses of the reagents. In the polymers of formaldehyde, for example paraformaldehyde, only 2–7% water is present. These polymers depolymerize in the reaction mixture at a controllable rate in the presence of a depolymerization catalyst. Hydrogen chloride is a catalyst for the depolymerization of aldehyde polymers such as paraldehyde, paraformaldehyde and trioxane, as well as a reactant in this process.

In making chloromethyl methyl ether the reactants of this process, methyl alcohol and formaldehyde, tend to form undesirable by-products, for example methylal, which contaminate the ether product. Furthermore, excess methanol may react with chloromethyl methyl ether to form methylate. In order to prevent formation of these impurities, we have found that a substantial excess of paraformaldehyde, for example 10%, over theoretical molar reactant proportions must be used. Even a slight excess of methanol will result in contamination of the product with methylal. The latter inhibits efficient use of chloromethyl methyl ether, e.g. in chloroalkylation of aromatic compounds. Also we have found a substantial excess of HCl, at least 30% in excess of the theoretical molar proportions, is necessary to prevent formation of contaminants. The excess amounts of both HCl and paraformaldehyde are critical in that a slight excess does not yield a chloromethyl methyl ether product of the desired purity.

Hydrogen chloride is bubbled through the reaction chamber continuously as the aldehyde polymer is added in stepwise increments. It should be noted that any substantially pure aldehyde form, such as gaseous aldehyde, may be used. As the three react to form an organic layer of chloroalkyl methyl ether, water is also produced which dissolves HCl. HCl is also dissolved in the organic layer as the ether is formed. When the reaction mixture becomes saturated with HCl, small amounts of aldehyde and methanol remain unreacted. These incremental quantities react with HCl at a slower rate than the major portions of the reactants since the presence of water tends to inhibit completion. To force the reaction to completion and keep the reaction mixture saturated with HCl, HCl is bubbled through after the mixture is saturated until the acid titer of the organic layer is at least 12.5 N. We have found that at least 30% molar excess of HCl must be bubbled through the reaction mixture to force the reaction with methanol and aldehyde to completion and produce the desired yield of pure ether.

Since the reaction between methyl alcohol, pure aldehydes such as paraformaldehyde, and hydrogen chloride is highly exothermic, the reaction mixture must be continuously stirred and cooled. To preclude an initial sudden temperature rise above 20° C., the methyl alcohol is cooled to 0° C. before the aldehyde is added. The temperature of the reaction must be maintained below 20° C. by continuous cooling and controlling the rate of addition of the aldehyde and/or HCl. If the temperature of the reaction rises above 20° C., by-products, for example, methylal, begin to form. At 30° C. the formation of by-products is rapid, and the reaction boils over at about 40° C. The temperature of the reaction mixture is regulated by stepwise addition of the aldehyde; the rate of addition is governed by the efficiency of the cooling system. By maintaining a temperature of the reaction below 20° C., the formation of by-products is prevented.

The addition of aldehyde in stepwise increments is a critical feature of the present invention. For example, when paraformaldehyde is mixed with the methanol and HCl then bubbled through, as in prior known processes, contaminants are formed in the organic layer. These contaminants are products of side reactions of unreacted methanol and formaldehyde. However, in the present invention the aldehyde is added in small amounts at approximately the same rate as the reaction with HCl and methanol proceeds. Thus there is no excess of unreacted aldehyde to side-react with the methanol, and the temperature of the reaction is easily kept below 20° C.

When 5–10% molar excess of aldehyde has been added to the mixture in stepwise increments and sufficient excess of HCl has been bubbled through the chamber whereby the organic layer has an acid titer of at least 12.5 N, reaction is complete. The mixture is allowed to stand for 10–16 hours at room temperature, and the HCl dissolved in the organic layer is evolved. The top organic layer of the mixture which decanted is substantially pure chloroalkyl methyl ether which needs no further purification. It is found that for the chloromethyl methyl ether to be effective in chloromethylation, the acid titer must be at least 12.5 N. In general, it is found that for alpha chloroalkyl methyl ethers, the acid titer must be at least 95% of theoretical for the resulting ether to be effective in chloroalkylations. Examples of these critical titers are:

| Ether | Theoretical Titer | Critical Titer |
|---|---|---|
| Chloromethyl | 13.2 N | 12.5 N |
| Chloroethyl | 10.5 N | 10.0 N |

*Example 1*

To a brine-cooled reaction chamber was added 100 parts by weight of methanol, and the temperature of the chamber was lowered to 0° C. Hydrogen chloride gas was fed into the bottom of the reaction chamber and bubbled through the liquid therein. Small (2–5 part) increments of solid paraformaldehyde were added to the reaction chamber at sufficient intervals to insure that the temperature of the reaction mixture never exceeded 20° C. When the temperature fell to 15° C., an additional increment of paraformaldehyde was added. The reaction mixture was continuously stirred and cooled as HCl and paraformaldehyde were being added. A clear, yellowish layer of chloromethyl methyl ether formed above a cloudy, milky aqueous solution of HCl and unreacted formaldehyde. A total of 105 parts of paraformaldehyde were added to the reaction chamber, an excess of 10.6% over 94 parts of formaldehyde theoretically required per 100 parts by weight of methanol. When approximately 158 parts of HCl, an excess of 38.5% over the 114 parts of HCl theoretically required, had been bubbled through the reaction chamber, a sample of the organic layer of the mixture was tested for acidity. The acid titer of the organic layer was 14.0 N, well above the 12.5 N critical concentration. (Chloromethyl methyl ether has a theoretical titer of 13.2.)

The reaction mixture was then allowed to stand twelve hours at room temperature in order to evolve the HCl absorbed in the organic layer. The clear upper layer of chloromethyl methyl ether was then decanted and dried over 5 parts of anhydrous calcium chloride; 225 parts were obtained, a yield of 85% based on 265 parts of chloromethyl ether theoretically produced per 100 parts by weight of methanol. 138 parts by weight of aqueous by-product in the lower layer were discarded. The chloromethyl ether product was extremely pure, well above 95%, as judged by the high level of chloromethylation obtained in reactions with other organic compounds.

*Example 2*

The same process outlined in Example 1 was carried out in preparing α-chloroethyl methyl ether from acetaldehyde, methanol, and hydrogen chloride. 100 parts by weight of methanol was cooled in a reaction vessel to 0° C. Hydrogen chloride was bubbled through the vessel while small portions of metacetaldehyde (a tetramer of acetaldehyde) were simultaneously added in stepwise increments. The reaction mixture was continuously cooled and stirred, the addition of aldehyde being controlled so that the temperature never rose above 20° C. A total of 145 parts by weight of the aldehyde was added to the reaction mixture, an excess of 10% over the 132 parts of acetaldehyde theoretically required per 100 parts by weight of methanol. A total of 155 parts of HCl were bubbled into the reaction mixture, an excess of 36% over the 114 parts of HCl theoretically required per 100 parts by weight of methanol. The reaction mixture separated into two layers, a clear-yellowish upper layer of α-chloroethyl methyl ether and a milky lower layer of aqueous by-products and unreacted aldehyde. The acid titer of the organic layer was 11.0 N, well above the critical 10.0 N. (Alpha chloroethyl methyl ether has a theoretical titer of 10.5 N.) The reaction mixture was then allowed to stand for 10 hours at room temperature to evolve the HCl dissolved in the organic layer. The clear upper layer of alpha chloroethyl methyl ether was then decanted. The upper layer, 248 parts by weight, was separated by decantation and dried over anhydrous calcium chloride. A yield of 87% was obtained based on a theoretical yield of about 285 parts of a chloroethyl methyl ether per 100 parts by weight of methanol. A boiling point test on the product obtained showed a boiling point of 74° C. compared with a boiling point of 73° C. for pure α-chloroethyl methyl ether.

Having thus disclosed my invention and the preferred embodiments thereof, I claim and desire to secure by Letters Patent:

1. The method of preparing alpha chloroalkyl methyl ethers comprising, introducing gaseous hydrogen chloride into a well-stirred reaction mixture consisting of methanol and a non-aqueous alkyl aldehyde with not more than 5 carbon atoms until the acid titer of the non-aqueous layer formed exceeds 95% of the theoretical titer, maintaining the temperature of the reaction mixture in the range of 0 to 20° C., simultaneously adding said aldehyde in at least five stepwise increments until at least a five percent stoichiometric excess of aldehyde over methanol has been added and thereafter separating the alpha chloroalkyl methyl ether from the aqueous by-product.

2. The method of claim 1 in which the aldehyde is paraformaldehyde and the alpha chloroalkyl methyl ether is chloromethyl methyl ether.

3. The method of claim 1 in which at least 30% stoichiometric excess of hydrogen chloride is added.

References Cited in the file of this patent
UNITED STATES PATENTS

| | | |
|---|---|---|
| 2,652,432 | Bauman et al. | Sept. 15, 1953 |
| 2,667,516 | Bauman et al. | Jan. 26, 1954 |
| 2,805,259 | Hurd | Sept. 3, 1957 |

OTHER REFERENCES

Farren et al.: Jour. Amer. Chem. Soc., vol. 47 (1925), pages 2419, 2421.

Henze et al.: Jour. Amer. Chem. Soc., vol. 53 (1931), pages 4077, 4079.

Shoemaker et al.: Jour. Amer. Chem. Soc., vol. 53 (1931), pages 1507, 1508.